UNITED STATES PATENT OFFICE.

IRVIN N. GLOVER, OF BAILEY, NORTH CAROLINA.

MEDICATED SALT BRICK.

1,314,076. Specification of Letters Patent. Patented Aug. 26, 1919.

No Drawing. Application filed December 1, 1916. Serial No. 134,467.

*To all whom it may concern:*

Be it known that I, IRVIN N. GLOVER, a citizen of the United States, residing at Bailey, in the county of Nash and State of North Carolina, have invented a new and useful Medicated Salt Brick, of which the following is a specification.

The object of my invention is to provide an improved medicated salt brick for the conditioning of cattle.

My medicated salt brick is composed of the following ingredients, which I prefer to use in about the following proportions, viz., gentian, ten grains, nux vomica ten grains, rhubarb, ten grains, salt-peter nine grains, sulfur twenty-one grains, copperas fifteen grains, lime two ounces, dairy salt two and seven-twelfths pounds.

The composition is prepared by mixing the ingredients together, shaping the mass in the form desired and allowing it to harden.

I claim:

1. A medicated composition of matter for cattle, having as ingredients a mixture of gentian, nux vomica, rhubarb, salt-peter, sulfur, copperas, dairy salt and lime.

2. A medicated salt brick composed of gentian, ten grains, nux vomica, ten grains, rhubarb ten grains, salt-peter nine grains, sulfur twenty-one grains, copperas fifteen grains, lime two ounces, and dairy salt two and seven-twelfths pounds, substantially in the proportions set forth.

IRVIN N. GLOVER.

Copies of this patent may be obtained for five cents each, by addressing the "Commissioner of Patents. Washington, D. C."